United States Patent
Achar et al.

(10) Patent No.: US 11,809,817 B2
(45) Date of Patent: Nov. 7, 2023

(54) METHODS AND SYSTEMS FOR TIME-SERIES PREDICTION UNDER MISSING DATA USING JOINT IMPUTE AND LEARN TECHNIQUE

(71) Applicant: Tata Consultancy Services Limited, Mumbai (IN)

(72) Inventors: Avinash Achar, Chennai (IN); Soumen Pachal, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/146,863

(22) Filed: Dec. 27, 2022

(65) Prior Publication Data

US 2023/0297770 A1 Sep. 21, 2023

(51) Int. Cl.
*G06F 17/00* (2019.01)
*G06F 40/177* (2020.01)
(Continued)

(52) U.S. Cl.
CPC .......... *G06F 40/177* (2020.01); *G06N 3/044* (2023.01); *G06N 3/045* (2023.01); *G06N 3/0499* (2023.01); *G06N 3/063* (2013.01)

(58) Field of Classification Search
CPC ...... G06F 40/177; G06N 3/044; G06N 3/045; G06N 3/0499; G06N 3/063
See application file for complete search history.

(56) References Cited

U.S. PATENT DOCUMENTS

| | | | |
|---|---|---|---|
| 8,818,919 B2 * | 8/2014 | Natarajan | G06Q 30/00 706/12 |
| 10,262,154 B1 * | 4/2019 | Kenthapadi | G06F 21/6227 |

(Continued)

FOREIGN PATENT DOCUMENTS

CN 109242207 A * 1/2019

OTHER PUBLICATIONS

Mehak Gupta et al, "Time-series Imputation and Prediction with Bi-Directional Generative Adversarial Networks," Machine Learning, 2020, Arxiv, https://arxiv.org/ftp/arxiv/papers/2009/2009.08900.pdf.

(Continued)

*Primary Examiner* — Laurie A Ries

(74) *Attorney, Agent, or Firm* — FINNEGAN, HENDERSON, FARABOW, GARRETT & DUNNER LLP

(57) ABSTRACT

Currently available time-series prediction techniques only factors last observed value from left of missing values and immediate observed value from right is mostly ignored while performing data imputation, thus causing errors in imputation and learning. Present application provides methods and systems for time-series prediction under missing data scenarios. The system first determines missing data values in time-series data. Thereafter, system identifies left data value, right data value, left gap length, right gap length and mean value for each missing data value. Further, system provides left gap length and right gap length identified for each missing data value to feed-forward neural network to obtain importance of left data value, right data value and mean value. The system then passes importance obtained for each missing data value to SoftMax layer to obtain probability distribution that is further utilized to calculate new data value corresponding to each missing data value in time-series data.

18 Claims, 8 Drawing Sheets

(51) Int. Cl.
*G06N 3/0499* (2023.01)
*G06N 3/063* (2023.01)
*G06N 3/044* (2023.01)
*G06N 3/045* (2023.01)

(56) References Cited

U.S. PATENT DOCUMENTS

| | | | |
|---|---|---|---|
| 11,423,118 B2* | 8/2022 | Shah | G06F 17/16 |
| 11,501,107 B2* | 11/2022 | Chauhan | G06N 3/04 |
| 2013/0346844 A1* | 12/2013 | Graepel | G06F 40/18 |
| | | | 715/219 |
| 2017/0017683 A1* | 1/2017 | Fourny | G06F 16/22 |
| 2017/0220672 A1 | 8/2017 | Sainani et al. | |
| 2019/0378022 A1 | 12/2019 | Wang et al. | |
| 2021/0034949 A1* | 2/2021 | Singh | G06N 3/044 |
| 2021/0406266 A1* | 12/2021 | Chan | G06N 3/08 |
| 2022/0137609 A1* | 5/2022 | Tsutsumi | G06Q 10/063 |
| | | | 700/96 |
| 2022/0197977 A1* | 6/2022 | Qiao | G06F 16/2477 |
| 2022/0269991 A1* | 8/2022 | Kurokawa | G06N 20/00 |
| 2022/0300512 A1* | 9/2022 | Adams | G06F 16/24542 |
| 2022/0318224 A1* | 10/2022 | Thompson | G06F 16/2282 |
| 2022/0318615 A1* | 10/2022 | Iwamori | G06N 3/044 |
| 2022/0343160 A1* | 10/2022 | Park | G06N 3/045 |
| 2022/0350457 A1* | 11/2022 | Li | G06F 3/0443 |
| 2023/0076149 A1* | 3/2023 | Chatterjee | G06N 3/044 |

OTHER PUBLICATIONS

Yonghong Luo et al., "E2GAN: End-to-End Generative Adversarial Network for Multivariate Time Series Imputation," Proceedings of the Twenty-Eighth International Joint Conference on Artificial Intelligence, 2019, IJCAI, https://www.ijcai.org/Proceedings/2019/0429.pdf.

* cited by examiner

3/8

calculating, by the MDPS via the one or more hardware processors, a left gap length for each cell based on current position of the left cell of each cell and the respective cell, and a right gap length for each cell based on current positions of the right cell of each cell and the respective cell
308d determining, by the MDPS via the one or more hardware processors, a mean value for each cell by computing a mean of at least one data value present in a row comprising the respective cell using a mean calculation formula
308e providing, by the MDPS via the one or more hardware processors, the left gap length and the right gap length calculated for each cell to a first feed-forward neural network to obtain an importance of the left data value, the right data value and the mean value determined for each cell
308f passing, by the MDPS via the one or more hardware processors, the importance obtained for each cell by the first feed-forward neural network to a SoftMax layer to obtain a probability distribution for the respective cell, wherein the probability distribution for each cell comprises three components, and wherein the three components comprise a left component, a right component, and a mean component
308g

METHODS AND SYSTEMS FOR TIME-SERIES PREDICTION UNDER MISSING DATA USING JOINT IMPUTE AND LEARN TECHNIQUE

PRIORITY CLAIM

This U.S. patent application claims priority under 35 U.S.C. § 119 to: Indian Patent Application No. 202221014328, filed on Mar. 16, 2022. The entire contents of the aforementioned application are incorporated herein by reference.

TECHNICAL FIELD

The disclosure herein generally relates to time-series prediction, and, more particularly, to methods and systems for time-series prediction under missing data using joint impute and learn technique.

BACKGROUND

Time-series prediction in presence of missing data is an old research problem. Researchers have provided a variety of techniques for data imputation over the years. Some researchers even stated employing Recurrent Neural Network (RNNs) for making prediction under missing sequential data over the years.

Currently, imputation techniques that are used by the researchers for time-series prediction under missing data scenarios mainly considered last observed value from left. However, immediate observed value from right that might be useful is mostly ignored which can cause serious errors while performing imputation and leaning. Further, the current technology is silent on how to handle forecasting scenarios under missing data using RNNs.

SUMMARY

Embodiments of the present disclosure present technological improvements as solutions to one or more of the above-mentioned technical problems recognized by the inventors in conventional systems. For example, in one aspect, there is provided a processor implemented method for time-series prediction under missing using joint impute and learn technique. The method includes receiving, by a missing data prediction system (MDPS) via one or more hardware processors, time-series data, the time-series data comprising one or more time dependent variables, each time dependent variable of the one or more time dependent variables comprising one or more data values, each data value of the one or more data values comprising one of: a single data value, and a missing entry; arranging, by the MDPS via the one or more hardware processors, the one or more data values received with the time-series data in a plurality of cells of a table; determining, by the MDPS via the one or more hardware processors, one or more cells in the plurality of cells that have the missing entry; for each cell of the one or more cells that has the missing entry, performing: determining, by the MDPS via the one or more hardware processor, a current position of each cell in the table; selecting, by the MDPS via the one or more hardware processor, a left cell and a right cell for each cell, wherein the left cell is selected for each cell if it is present in closest left side of the current position of each cell and contains the data value, wherein the right cell is selected for each cell if it is present in closest right side of the current position of each cell and contains the data value; accessing, by the MDPS via the one or more hardware processors, a left data value from the left cell of each cell and a right data value from the right cell of each cell; calculating, by the MDPS via the one or more hardware processors, a left gap length for each cell based on current position of the left cell of each cell and the respective cell, and a right gap length for each cell based on current positions of the right cell of each cell and the respective cell; determining, by the MDPS via the one or more hardware processors, a mean value for each cell by computing a mean of at least one data value present in a row comprising the respective cell using a mean calculation formula; providing, by the MDPS via the one or more hardware processors, the left gap length and the right gap length calculated for each cell to a first feed-forward neural network to obtain an importance of the left data value, the right data value and the mean value determined for each cell; passing, by the MDPS via the one or more hardware processors, the importance obtained for each cell by the first feed-forward neural network to a SoftMax layer to obtain a probability distribution for the respective cell, wherein the probability distribution for each cell comprises three components, and wherein the three components comprise a left component, a right component, and a mean component; calculating, by the MDPS via the one or more hardware processors, a new data value for each cell based, at least in part, on the three components, the left data value, the right data value and the mean value obtained for the respective cell using a predefined formula; substituting, by the MDPS via the one or more hardware processors, each cell of the one or more cells that has the missing entry with the new data value calculated for the respective cell to obtain an updated table; and creating, by the MDPS via the one or more hardware processors, a new time-series data based on the updated table.

In another aspect, there is provided a missing data prediction system (MDPS) for time-series prediction under missing using joint impute and learn technique. The system includes a memory storing instructions; one or more communication interfaces; and one or more hardware processors coupled to the memory via the one or more communication interfaces, wherein the one or more hardware processors are configured by the instructions to: receive time-series data, the time-series data includes one or more time dependent variables, each time dependent variable of the one or more time dependent variables includes one or more data values, each data value of the one or more data values includes one of: a single data value, and a missing entry; arrange the one or more data values received with the time-series data in a plurality of cells of a table; determine one or more cells in the plurality of cells that have the missing entry; for each cell of the one or more cells that has the missing entry, perform: determining a current position of each cell in the table; selecting a left cell and a right cell for each cell, wherein the left cell is selected for each cell if it is present in closest left side of the current position of each cell and contains the data value, wherein the right cell is selected for each cell if it is present in closest right side of the current position of each cell and contains the data value; accessing a left data value from the left cell of each cell and a right data value from the right cell of each cell; calculating a left gap length for each cell based on current position of the left cell of each cell and the respective cell, and a right gap length for each cell based on current positions of the right cell of each cell and the respective cell; determining a mean value for each cell by computing a mean of at least one data value present in a row comprising the respective cell using a mean calculation formula; providing the left gap length and the right gap length calculated for each cell to a first feed-forward neural network to obtain an importance of the left data value, the right data value and the mean value determined for each cell; passing the importance obtained for each cell by the first feed-forward neural network to a SoftMax layer to obtain a probability distribution for the respective cell, wherein the probability distribution for each cell comprises three components, wherein the three components comprise a left component, a right component, and a mean component; and calculating a new data value for each cell based, at least in part, on the three components, the left data value, the right data value, and the mean value obtained for the respective cell using a predefined formula; substitute each cell of the one or more cells that has the missing entry with the new data value calculated for the respective cell to obtain an updated table; and create a new time-series data based on the updated table.

In yet another aspect, there are provided one or more non-transitory machine-readable information storage mediums comprising one or more instructions which when executed by one or more hardware processors cause time-series prediction under missing using joint impute and learn technique using: receiving, by a missing data prediction system (MDPS), time-series data, the time-series data comprising one or more time dependent variables, each time dependent variable of the one or more time dependent variables comprising one or more data values, each data value of the one or more data values comprising one of: a single data value, and a missing entry; arranging, by the MDPS, the one or more data values received with the time-series data in a plurality of cells of a table; determining, by the MDPS, one or more cells in the plurality of cells that have the missing entry; for each cell of the one or more cells that has the missing entry, performing: determining, by the MDPS, a current position of each cell in the table; selecting, by the MDPS, a left cell and a right cell for each cell, wherein the left cell is selected for each cell if it is present in closest left side of the current position of each cell and contains the data value, wherein the right cell is selected for each cell if it is present in closest right side of the current position of each cell and contains the data value; accessing, by the MDPS, a left data value from the left cell of each cell and a right data value from the right cell of each cell; calculating, by the MDPS, a left gap length for each cell based on current position of the left cell of each cell and the respective cell, and a right gap length for each cell based on current positions of the right cell of each cell and the respective cell;

determining, by the MDPS, a mean value for each cell by computing a mean of at least one data value present in a row comprising the respective cell using a mean calculation formula; providing, by the MDPS, the left gap length and the right gap length calculated for each cell to a first feed-forward neural network to obtain an importance of the left data value, the right data value and the mean value determined for each cell; passing, by the MDPS, the importance obtained for each cell by the first feed-forward neural network to a SoftMax layer to obtain a probability distribution for the respective cell, wherein the probability distribution for each cell comprises three components, and wherein the three components comprise a left component, a right component, and a mean component; calculating, by the MDPS, a new data value for each cell based, at least in part, on the three components, the left data value, the right data value and the mean value obtained for the respective cell using a predefined formula; substituting, by the MDPS, each cell of the one or more cells that has the missing entry with the new data value calculated for the respective cell to obtain an updated table; and creating, by the MDPS, a new time-series data based on the updated table.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A, 3B and 3C, collectively, represent an exemplary flow diagram of a method for time-series prediction under missing data, in accordance with an embodiment of the present disclosure.

DETAILED DESCRIPTION

Figure 1:
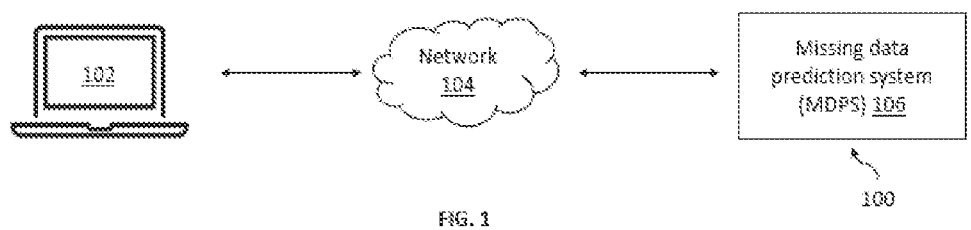
FIG. 1 illustrates an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A time-series is a collection of observations that are observed at regular intervals. Today, time series classification and forecasting are among the most common techniques employed by the businesses for making future predictions. But accuracy of the future predictions depends largely on the accuracy of the past time-series data that is collected and used for making those predictions. So, any type of missingness in the collected time-series data can bring major changes in the predicted outcomes if the missing data is not handled effectively. As discussed previously, to handle missing data in time-series, researchers working in the field of time-series prediction under missing data have come up with a variety of techniques including RNN based techniques. In particular, the researchers have adopted RNN based models for tackling both classification and forecasting task. The RNN based models that can be employed includes vanilla RNN models, Long Short-Term Memory (LSTM) based models and Gated Recurrent Units (GRU) based models.

However, the computation approaches that are adopted may either work for the classification task or for the forecasting task but not both.

Further, currently available RNN based techniques, such as GRU-D only factors the left-end of a gap of missing values and the right end of the gap is totally ignored while performing data imputation, thus causing errors in imputation and learning.

Embodiments of the present disclosure overcome the above-mentioned disadvantages by providing systems and methods for time-series prediction under missing data using joint impute and learn technique. More specifically, the systems and the methods of the present disclosure follow a joint impute and learn technique (also referred as GRU-DE) that factors closest left and right observations in addition to mean for deciding the most appropriate input for the missing data. Basically, the systems and the methods help in reducing errors that occur during imputation and learning stage, thereby making it helpful in applications where missing data scenarios are very common. For example, in case of disease classification where periodic testing of multiple parameters is required for performing classification, the requirement may not be fulfilled as not all parameters associated with patients are tested every time thus leading to missing data scenarios. In these scenarios, accurate imputation of missing data would be helpful in performing accurate classification.

Additionally, the systems and the methods can be used for both time series (sequence) classification as well as for forecasting. The system and the method also ensure that imputation of multi-step targets during multi-step forecasting are totally avoided.

To understand the working of a system, the essentials of GRU-D technique is explained first as the system which is an extension of the existing GRU-D technique.

As the name suggests, among the three recurrent choices of plain RNN, LSTM and GRU, the GRU-D technique uses GRU as the gating mechanism present in the GRU mitigates vanishing gradients and have more persistent memory as compared to other available RNN's. Further, lesser gate count in GRU helps in keeping number of weight parameters much smaller as compared to other available RNN's. A single hidden layer in plain RNN can be specified as:

$$h_t = \sigma(W^h h_{t-1} + W^u u_t + b) \quad \text{equation (1)}$$

Where, $W_h$ and $W^u$ are weight matrices associated with a state at a previous time instant $h_{t-1}$ and current input $u_t$, respectively, and $\sigma(.)$ denotes sigmoid function.

Whereas GRU based cell computes its hidden state for one layer using below-mentioned equations:

$$z_t = \sigma(W^z u_t + U^z h_{t-1} + b_z) \quad \text{equation (2),}$$

$$r_t = \sigma(W^r u_t + U^r h_{t-1} + b_r) \quad \text{equation (3),}$$

$$\tilde{h}_t = \tanh(U(r_t \odot h_{t-1}) + W u_t + b) \quad \text{equation (4),}$$

$$h_t = (1 - z_t) \odot h_{t-1} + z_t \odot \tilde{h}_t \quad \text{equation (5)}$$

Where, $z_t$ represents an update gate factor, $r_t$ represents a reset gate factor, $h_t$ represents new memory that is a function of $u_t$ and $h_{t-1}$ i.e., the previous hidden state, As can be seen in above-mentioned equations (2) to (5), a reset signal controls influence of a previous state on the new memory and a final current hidden state is a convex combination of the new memory and the memory at previous step, $h_{t-1}$. It should be noted that all associated weight matrices, such as $W^z$, $W^r$, $W$, $U^z$, $U^r$ and $U$, and vectors, such as $b_z$, $b_r$ and $b$ are trained using backpropagation through time (BPTT) algorithm in GRU.

For understanding the GRU-D technique, it is assumed that there is multi-variate time-series X with D variables of length T. The time-series X can be denoted as:

$$X = (X_1, X_2, \ldots, X_T)^T \in R^{T \times D}$$

In the time series X, $x_t \in R^D$ represents the $t^{th}$ observation and $x_t^d$ represents $d^{th}$ component of the $t^{th}$ observation. Let $s_t \in R$ denote the time-stamp of $x_t$ i.e., the time instant at which the measurement happens. Further, to capture variables that are missing in the time series X and at which time instant, a binary masking variable $m_t^d$ is defined as:

$$m_t^d = \begin{cases} 1 \\ 0 \end{cases} \quad \text{equation (6)}$$

The binary masking variable takes the value '1' in case the $x_t^d$ is observed i.e., the variable is present otherwise take the value '0'. Additionally, in GRU-D, a time-interval variable $\delta_t^{dL}$ is also maintained for denoting distance from a closest available data point on the left of $d^{th}$ variable. The $\delta_t^{dL}$ can be represented as:

$$\delta_t^{dL} = \begin{cases} s_t - s_{t-1} + \delta_{t-1}^{iL}, & \text{if } t > 1 \text{ and } m_{t+1} = 0 \\ s_t - s_{t-1}, & t > 1 \text{ and } m_{t+1} = 1 \\ 0, & t = 1 \end{cases} \quad \text{equation (7)}$$

The equation (7) states that when data is missing at time-step t at the $d^{th}$ input variable, $\delta_t^{dL}$ denotes distance from the closest available data point to the left of $t^{th}$ observation. In case the data is present, $\delta_t^{dL}$ is considered as consecutive time stamp difference and initially the $\delta_t^{dL}$ is considered as '0'.

The GRU-D technique also includes a decay mechanism for capturing more relevant information from left end of the gap in case the data is missing at the $d^{th}$ input variable. It should be noted that the decay mechanism of GRU-D works with $\delta_t^L$ (a vector denoting distance from closest available data-point from left of missing input variable) only as a decay factor is modelled using a monotonically decreasing function of $\delta_t^L$. The decay factor lies in the range of '0 to 1'. A vector of decay rates is expressed as:

$$\gamma_t^L = \exp\{-\max(0, W_\gamma \delta_t^L + b_\gamma)\} \quad \text{equation (8)}$$

Where, $W_\gamma$ represents assumed diagonal.

In equation (8), a component wise independence of the decay rates is assumed. A modified input that is passed to the GRU after considering decay factor is:

$$\hat{x}_t^d = m_t x_t^d + (1 - m_t)(\gamma_t^{dL} x_t^{dL} + (1 - \gamma_t^{dL}) \bar{x}^d) \quad \text{equation (9),}$$

Where, $x_t^{dL}$ represents last observation to the left of t, $\hat{x}_t^d$ represents empirical mean of the $d^{th}$ input variable, $\gamma_t^{dL}$ represents modified input for each cell of table.

So, if $u_t$ is replaced by $\hat{x}_t^d$ in equations (2) to (5), the GRU-D technique incorporates input decay.

Further, as can be seen in above-mentioned equations, GRU-D works on a principle that closer a missing observation is to the left end of the gap i.e., $\delta_t^L \rightarrow 0$, closer will $\hat{x}_t^d$ be to $x_t^{dL}$. Similarly, farther away the missing observation is from left end of the gap, closer will $\hat{x}_t^d$ be to $\bar{x}^d$. In simple terms, GRU-D either considers the left end of the gap i.e., a closest left observation from the missing observation for deciding the modified input or considers the empirical mean for deciding the modified input. So, in the whole process of deciding the modified input for the missing observation, the GRU-D technique completely ignores information from right end of the gap i.e., a closest right observation from the missing observation.

However, in some scenarios, missing observation that is far away from the left end of the gap may be actually very close to a right end of the gap. In that case, $\hat{x}_t^d$ must be close to $x_t^{dR}$ i.e., last observation to a right of t instead of $x_t^{dL}$ when the left gap length is large.

In the present disclosure, the system ensures accurate imputation of missing observation by providing a missing data prediction system (explained in detail with reference to FIGS. 1, 2 and 3) that decides the most appropriate input for missing data in a time-series by factoring closest right observation along with closest left and the mean. For doing so, the missing data prediction system first determines one or more missing data values i.e., data values that are missing in the time-series. Thereafter, for each missing data value in the time-series, the missing data prediction system identifies a left data value, a right data value, a left gap length, a right gap length and a mean value. Further, the missing data prediction system provides the left gap length, the right gap length and the mean value identified for each missing data value to a feed-forward neural network to obtain an importance of the left data value, the right data value and the mean value determined for each missing data value. Once the importance is obtained for each missing data value, the missing data prediction system passes the importance obtained for each missing data value to a SoftMax layer to obtain a probability distribution for the respective missing data value. The obtained probability distribution is then utilized by the missing data prediction system to calculate a new data value corresponding to each missing data value in the time-series.

Referring now to the drawings, and more particularly to FIGS. 1 through 5C, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, arranging data values in cells of a table, determining cells with missing entry etc. The environment 100 generally includes an electronic device 102, and a missing data prediction system (hereinafter referred as 'MDPS') 106, each coupled to, and in communication with (and/or with access to) a network 104. It should be noted that one electronic device is shown for the sake of explanation; there can be more number of electronic devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The electronic device 102 is associated with a user (e.g., a user or an entity such as an organization) that is involved in generation of the time-series data. Examples of the electronic device 102 include, but are not limited to, a server system, a computer system, a personal computer (PC), a mobile phone, a tablet device, a Personal Digital Assistant (PDA), a voice activated assistant, a smartphone, and a laptop.

The missing data prediction system (MDPS) 106 includes one or more hardware processors and a memory. The MDPS 106 is configured to perform one or more of the operations described herein. The MDPS 106 is configured to receive time-series data associated with a time-series via the network 104 from the electronic device 102. The time-series can be one of a univariate time series and a multivariate time series. The time-series data includes one or more time dependent variables and each time dependent variable of the one or more time dependent variables includes one or more data values. The MDPS 106 is then configured to arrange the one or more data values in a plurality of cells of a table. Thereafter, the MDPS 106 is configured to determine one or more cells that have the missing entry (hereinafter also referred as missing entry cells).

Once the cells with missing entries are determined, the MDPS 106 is configured to determine a current position of each missing entry cell in the table. Based on the current position, the MDPS 106 is configured to select a left cell and a right cell for each missing entry cell. It should be noted that the left cell is selected by the MDPS if it is present in closest left side of the missing entry cell and contains the data value, and the right cell is selected if it is present in closest right side of the missing entry cell and closest right side of the current position of each missing entry cell and contains the data value.

As discussed previously, in addition to the time-interval variable $\delta_t^{dL}$ that is maintained for denoting distance from the closest available data point on the left i.e., the left cell of $t^{th}$ observation in GRU-D, the MDPS 106 also maintains $\delta_t^{dR}$ for denoting distance from the closest available data point on the right i.e., the right cell of the missing point or missing entry cell i.e., the $t^{th}$ observation. The $\delta_t^{dR}$ can be represented as:

$$\delta_t^{dR} = \begin{cases} s_{t+1} - s_t + \delta_{t+1}^{dR}, & \text{if } t < T \text{ and } m_{t+1} = 0 \\ s_{t+1} - s_t, & t < T \text{ and } m_{t+1} = 1 \\ 0, & t = T \end{cases} \qquad \text{equation (10)}$$

Further, the MDPS 106 is configured to a calculate left gap length based on current position of the missing entry cell and the left cell and a right gap length for each missing entry cell based on current position of the missing entry cell and the right cell. Then, the MDPS 106 is configured to calculate a mean value for each missing entry cell by computing a mean of at least one data value present in a row comprising the respective missing entry cell using a mean calculation formula.

Thereafter, the MDPS 106 passes the left gap length and the right gap length calculated for each missing entry cell to a first feed-forward neural network to obtain importance of a left data value present in the left cell, a right data value present in the right cell and the mean value calculated for each missing entry cell. In an embodiment, the importance is obtained in form of an output of dimension 3×1.

Once the importance is received, the MDPS 106 passes the importance obtained for each missing entry cell to a SoftMax layer to obtain a probability distribution for the respective missing entry cell. In an embodiment, the probability distribution includes three components i.e., a left component, a right component, and a mean component. It should be noted that the sum of all three components i.e., the left component, the right component, and the mean component should be equal to '1'.

So, instead of learning one decay factor, the MDPS 106 learns three weights as follows. Let $\delta_t^d = [\delta_t^{dL}, \delta_t^{dR}]$, $$a_t = \tanh(W_i^d \delta_t^d + b^i) \quad \text{equation (11)},$$

$$\Gamma_t = \tanh(W_o^d a_t + b^o) \quad \text{equation (12)},$$

$$\gamma_t^{dL} = \frac{\exp(\Gamma_t(1))}{\exp(\Gamma_t(1)) + \exp(\Gamma_t(2)) + \exp(\Gamma_t(3))}, \quad \text{equation (13)}$$

$$\gamma_t^{dR} = \frac{\exp(\Gamma_t(2))}{\exp(\Gamma_t(1)) + \exp(\Gamma_t(2)) + \exp(\Gamma_t(3))}, \quad \text{equation (14)}$$

$$\gamma_t^{dm} = \frac{\exp(\Gamma_t(3))}{\exp(\Gamma_t(1)) + \exp(\Gamma_t(2)) + \exp(\Gamma_t(3))}, \quad \text{equation (15)}$$

$$\gamma_t^{dL} + \gamma_t^{dR} + \gamma_t^{dm} = 1 \quad \text{equation (16)}$$

Where, $a_t$ represents first layer feed forward network equation, $\Gamma_t$ represents second layer feed forward network equation that takes input from the first layer feed forward network equation, $\gamma_t^{dL}$ represents the left component, $\gamma_t^{dR}$ represents the right component, $\gamma_t^{dm}$ represents the mean component, and equation (11) and equation (12) in combination represent a two layer feed-forward neural network.

The probability distribution is then utilized by the MDPS 106 to calculate a new data value for each missing entry cell using a predefined formula. In particular, the new data value is convex combination of three quantities i.e., the $x_t^{dL}$ (closest observation to the right of $t^{th}$ observation i.e., the left data value), $x_t^{dR}$ (closest observation to the right of $t^{th}$ observation i.e., the right data value) and $\tilde{x}^d$ i.e., the mean value calculated for missing entry cell i.e., $d^{th}$ variable. The predefined formula can be represented as:

$$\hat{x}_t^d = m_t^d x_t^d + (1 - m_t^d)(\gamma_t^{dL} x_t^{dL} + \gamma_t^{dR} x_t^{dR} + \gamma_t^{dm} \tilde{x}^d) \quad \text{equation}$$

The above-mentioned equation (17) works on the principle that when the missing entry cell ($m_t = 0$) is closer to left end of the gap i.e., when gap between the missing entry cell and the left cell is less, then $\hat{x}_t^d$ i.e., the new data value is close to the $x_t^{dL}$ i.e., the left data value. Similarly, when gap between the missing entry cell and the right cell is less, then $\hat{x}_t^d$ is close to the $x_t^{dR}$ i.e., the right data value. Further, when the gap length is around center, then $\hat{x}_t^d$ is close to the $\tilde{x}^d$ i.e., the mean value. Additionally, when the gap length i.e., $(\delta_t^{dL} + \delta_t^{dR})$ is less or medium, the equation (17) ignores the $\tilde{x}^d$ completely.

Then, the MDPS 106 substitutes each cell that has the missing entry with the new data value calculated for the respective missing entry cell to obtain an updated table. Finally, the MDPS 106 creates a new time-series data based on the updated table.

The created new time-series data can then be passed by the MDPS 106 as an input to a RNN for performing a task. The task can be one of a classification task and a forecasting task depending on an end requirement of the received time series. Additionally, the MDPS 106 may also add a decayed factor to a hidden state present in the RNN for improving an output of the classification/forecasting task.

As discussed previously, the GRU-D technique includes the decay mechanism for capturing more relevant information from left end of the gap in case the data is missing at the $d^{th}$ input variable. Along with decay mechanism, the GRU-D also includes a hidden decay state $\gamma_t$ that is implemented by decaying a previous hidden state $h_{t-1}$ follows:

$$\hat{h}_{t-1} = \gamma_t^h \odot h_{t-1} \quad \text{equation (18)},$$

So, when $h_{t-1}$ is replaced by $\hat{h}_{t-1}$ in equations (2) to (5), the hidden decay state $\gamma_t$ in GRU-D is established. However, the hidden decay is again based on the left end of any gap. Thus, to overcome, the MDPS 106 add a decayed factor to a hidden state that also incorporates the decay of state from right end of the gap along with the left end. In particular, the decay is incorporated as bi-directional hidden layer. So, the hidden state information of layer where information flow is from right to left is decayed using another decay factor $\gamma_t^{hr}$ as a function of the time interval $\delta_t^R$ represented as:

$$\gamma_t^{hb} = \exp\{-\max(0, W_\gamma^R \delta_t^R + b_\gamma^R)\},$$

Where, $W_\gamma^R$ and $b_\gamma^R$ represents weights of the RNN.

In particular, the decaying from the appropriate adjacent hidden states for a forward and backward layer can be computed using:

$$\hat{h}_{t-1} = \gamma_t^{hf} \odot h_{t-1}^f,$$

$$\hat{h}_{t+1}^b = \gamma_t^{hb} \odot h_{t+1}^b,$$

Where, $\hat{h}_{t-1}^f$ represents forward layer hidden states, and $h_{t+1}^b$ represents backward layer hidden states.

In an embodiment, one or more training samples are used to train the MDPS to perform the forecasting task/classification task. Each training sample of the one or more training samples includes an input window and an output window. In case the MDPS is being trained to perform the classification task, a target variable in the output window of each training sample is an important variable and cannot be missing as without the target variable, the MDPS cannot be trained to perform the classification task. But in case the MDPS is being trained to perform the forecasting task, the MDPS can still be trained to perform the forecasting task in absence of the target variable in the output window using a target imputation method. The target imputation method is explained in detail with reference to FIGS. 5A-5C.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
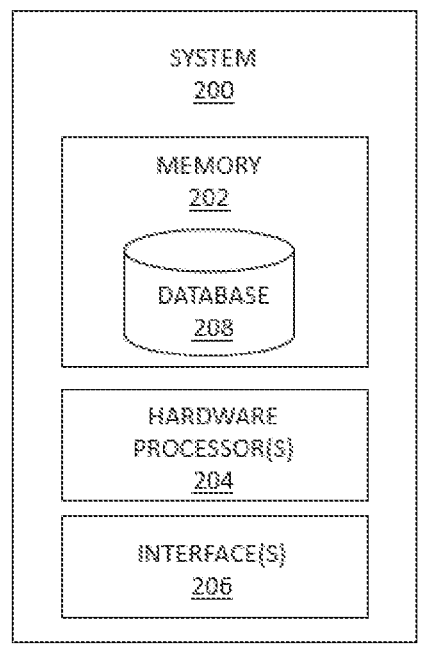
FIG. 2 illustrates an exemplary block diagram of a missing data prediction system (MDPS) for time-series prediction under missing data, in accordance with an embodiment of the present disclosure.

FIG. 2 illustrates an exemplary block diagram of a missing data prediction system (MDPS) for time-series prediction under missing data, in accordance with an embodiment of the present disclosure. In an embodiment, the missing data prediction system (MDPS) may also be referred as system and may be interchangeably used herein. The system 200 is similar to the MDPS 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

In an embodiment, the system 200 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, new time-series data created based on the received time series data. In an embodiment, the memory 202 may store information pertaining to pre-defined formulas, training algorithms, and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

Figure 3A:
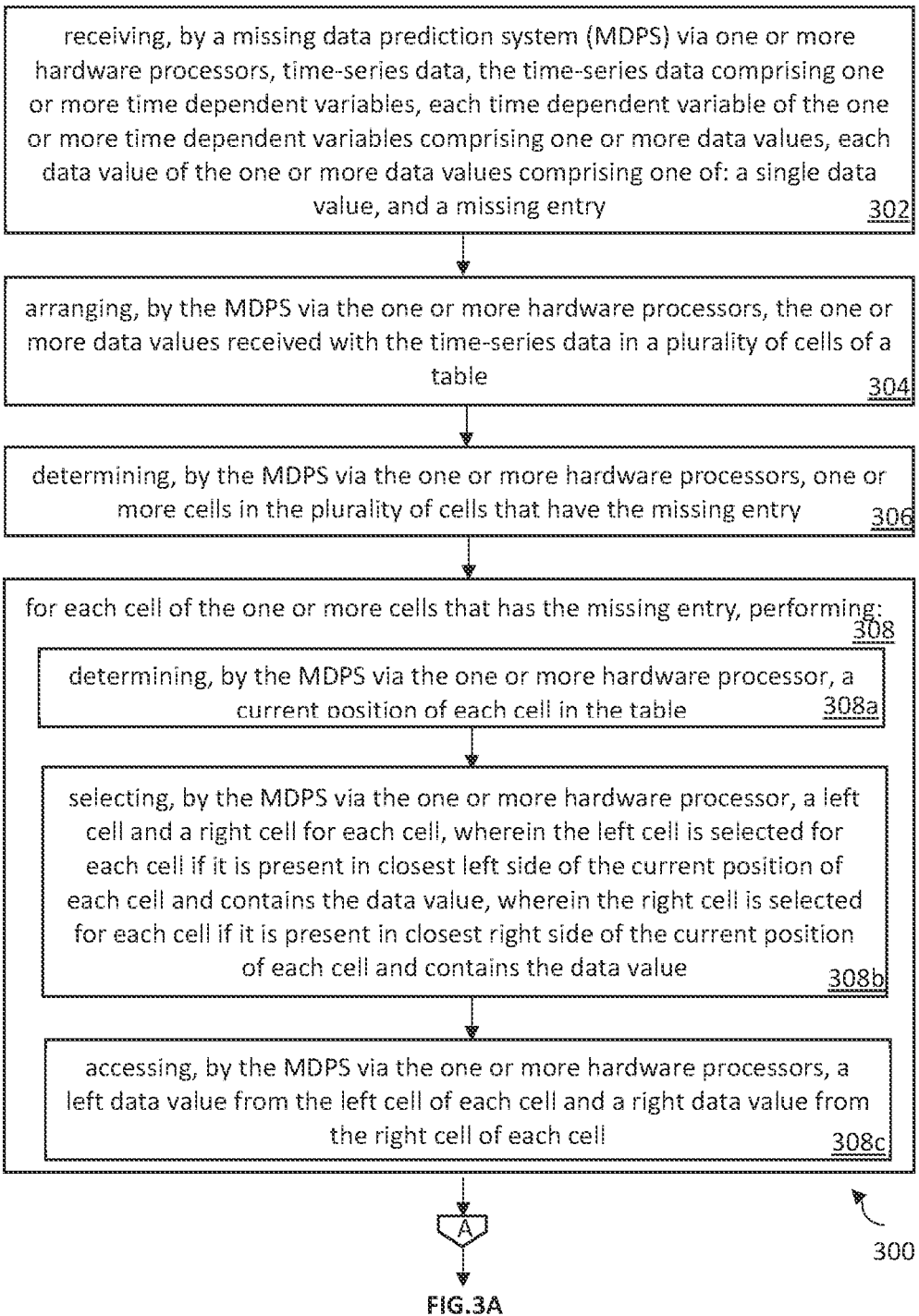
Figure 3C:
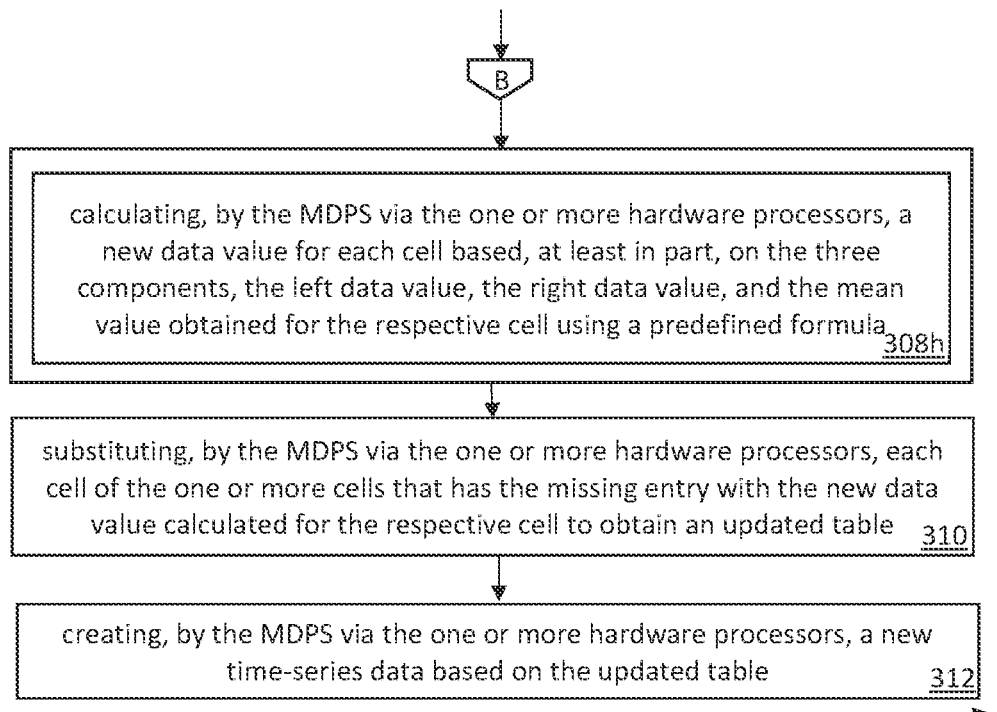

FIGS. 3A, 3B and 3C, with reference to FIGS. 1-2, collectively, represent an exemplary flow diagram of a method 300 for time-series prediction under missing data using the MDPS 100 of FIG. 1 and system 200 of FIG. 2, in accordance with an embodiment of the present disclosure. In an embodiment, the system 200 comprises one or more data storage devices or the memory 202 operatively coupled to the one or more hardware processors 204 and is configured to store instructions for execution of steps of the method 300 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method 300 of the present disclosure will now be explained with reference to the components of the MDPS 100 as depicted in FIG. 1, and the system 200 of FIG. 2.

In an embodiment of the present disclosure, at step 302, the one or more hardware processors 204 of the system 200 receive time-series data from an electronic device (e.g., the electronic device 102). The time-series data includes one or more time dependent variables. Each time dependent variable of the one or more time dependent variables includes one or more data values, and each data value of the one or more data values include one of a single data value, and a missing entry. In an embodiment, the missing entry in a data value is a void of the data value. An example representation of the multi-variate time series data is shown below:

("date","Temperature","Humidity","Light","HumidiyRatio","Occupancy"
"2022-02-04 17:51:00",23.18,27.272,42, 0.00479298817650529,1
"2022-02-04 17:51:59",23.15,27.2675, 0.00478344094931065,1
"2022-02-04 17:53:00",23.15,27.245, 0.00477946352442199,1
"2022-02-04 17:54:00",23.15,27.2, 0.00477150882608175,1
"2022-02-04 17:55:00",23.1,27.2, 0.00475699293331518,1
"2022-02-04 17:55:59",23.1,27.2,0.00475699293331518,1)

In the above example representation, the one or more time dependent variables are "date", "temperature", "humidity", "light", "humidity ratio" and "occupancy". The one or more data values that are associated with time dependent variables "temperature" include "23.18, 23.15, 23.15, 23.15, 23.1, 23.1".

At step 304 of the present disclosure, the one or more hardware processors 204 of the system 200 arrange the one or more data values received with the time-series data in a plurality of cells of a table. In an embodiment, the one or more time dependent variables present in the time-series data are arranged as rows of the table and the one or more data values associated with each time dependent variable are arranged in one or more column cells present corresponding to row of the respective time dependent variable.

At step 306 of the present disclosure, the one or more hardware processors 204 of the system 200 determine one or more cells in the plurality of cells that have the missing entry. In particular, the cells in the table that does not contain any data value are determined at this step. In a non-limiting example, it is assumed that "$x_1, x_2, x_3, x_4, x_5, x_6, x_7, x_8, x_9, x_{10}, x_{11}, x_{12}, x_{13}, x_{14}, x_{15}$" are the data values associated with a time dependent variable in a univariate time series of length 15. So, 15 data values will be arranged in 15 cells of the table. Suppose the cells with data values $x_3, x_4, x_5, x_6, x_9, x_{12}, x_{13}$ are found to have the missing entry in the table i.e., the data values are not present for the $x_3, x_4, x_5, x_9, x_{12}, x_{13}$.

At step 308 of the present disclosure, the one or more hardware processors 204 of the system 200, upon determining that the one or more cells in the table have the missing entry, calculate a new data value for each cell of the one or more cells that has the missing entry by performing a plurality of steps 308a through 308h for each missing entry cell.

At step 308a of the present disclosure, the one or more hardware processors 204 of the system 200 determine a current position of each cell i.e., the missing entry cell in the table. In particular, the hardware processors 204 determine at which row and column a cell corresponding to a missing entry is present in the table.

At step 308b of the present disclosure, the one or more hardware processors 204 of the system 200 select a left cell and a right cell for each cell i.e., the missing entry cell in the table. Once the current position of each missing entry cell is determined, the hardware processors 204 select the left cell and the right cell for each missing entry cell based on the current position of each missing entry cell. In an embodiment, the left cell for the missing entry cell is selected if it is present in closest left side of the current position of each cell and contains the data value i.e., the left cell is last observed data value in a left side of a row of the missing entry cell. Similarly, the right cell for the missing entry cell is selected if it is present in closest right side of the current position of each cell and contains the data value i.e., the right cell is a last observed data value in a right side of a row of the missing entry cell. With reference to previous example, it is assumed that t=5 is the determined current position of $x_5$ that is found to be missing in the table, then the left cell that is selected by the system is cell containing $x_2$ and the right cell is cell containing $x_7$.

At step 308c of the present disclosure, the one or more hardware processors 204 of the system 200 access a left data value from the left cell of each cell and a right data value from the right cell of each cell. So, the data values of $x_2$ and $x_7$ are accessed by the system at this step.

At step 308d of the present disclosure, the one or more hardware processors 204 of the system 200 calculate a left gap length for each cell based on current position of the left cell of each cell and the respective cell, and a right gap length for each cell based on current positions of the right cell of each cell and the respective cell. Basically, gap length between the current position of the selected left cell and the missing data cell, and the gap length between the current position of the selected right cell and the missing data cell is determined at this step. So, with reference to previous example, the left gap length for the $x_5$ is 5−2=3 and the right gap length for $x_5$ is 7−5=2

At step 308e of the present disclosure, the one or more hardware processors 204 of the system 200 determine a mean value for each cell by computing a mean of at least one data value present in a row comprising the respective cell using a mean calculation formula. In particular, the mean of the data values present in the row of the missing data value is computed at this stage using the mean calculation formula that is represented as:

$$\bar{x}^d = (1/\text{Number of data values present in } row)*\Sigma x_i,$$

where i=1 to umber of data values present in row.

So, with reference to previous example, global mean of 15 data values is determined at this step using $(1/15)*\Sigma x_i$ for i=1 to 15.

At step 308f of the present disclosure, the one or more hardware processors 204 of the system 200 provide the left gap length and the right gap length calculated for each cell to a first feed-forward neural network to obtain an importance of the left data value, the right data value and the mean value determined for each cell. The calculated left gap length i.e., 3 and calculated right gap length i.e., 2 are passed to the first feed-forward neural network to obtain the importance of the left data value, the right data value and the mean value based on the left gap length and the right gap length.

In an embodiment, the hardware processors 204 may obtain the importance in form of an output of dimension 3×1. With reference to the above-mentioned example, the output of the first feed-forward neural network can be [60.01, 26.24, 13.50].

At step 308g of the present disclosure, the one or more hardware processors 204 of the system 200 pass the importance obtained for each cell by the first feed-forward neural network to a SoftMax layer to obtain a probability distribution for the respective cell. The probability distribution for each cell i.e., the missing data cell includes three components viz a left component, a right component, and a mean component. The left component represents the probability distribution for the left data value, the right component represents the probability distribution for the right data value, and the mean component represents the probability distribution for the mean value. In an example embodiment, with reference to the above-mentioned example when [60.01, 26.24, 13.50] is passed to the SoftMax layer, the SoftMax layer can provide the output of [0.6, 0.26, 0.14]. In the output, '0.6' represents the left component, '0.26' represents the right component and '0.14' represents the mean component.

As explained previously, $\gamma_t^{dL}+\gamma_t^{dR}+\gamma_t^{dm}=1$ i.e., the summation of the left component, the right component, and the mean component is always equivalent to '1'.

At step 308h of the present disclosure, the one or more hardware processors 204 of the system 200 calculate a new data value for each cell based, at least in part, on the three components, the left data value, the right data value, and the mean value obtained for the respective cell using the predefined formula mentioned in equation (17). Basically, the new data value for each missing data cell is computed at this step based on the left component, the right component, the mean component, the left data value, the right data value, and the mean value obtained for each missing data cell. So, with reference to previous example, as $m_t^d=0$, the new date value for the $x_5$ is "0+0.6 (left component)*left data value +0.26 (right component)*right data value +0.14 (mean component)*mean value".

At step 310 of the present disclosure, the one or more hardware processors 204 of the system 200 substitute each cell of the one or more cells that has the missing entry with the new data value calculated for the respective cell to obtain an updated table. Once the new data value is obtained for each missing entry cell, the hardware processors 204 place the new data values in the missing entry cells and thus obtains an updated table. In an embodiment, the updated table has no missing entry cells.

At step 312 of the present disclosure, the one or more hardware processors 204 of the system 200 create a new time-series data based on the updated table. Once the updated table is available with no missing values, the one or more hardware processors 204 convert the updated table into the new time series data that contains no missing values. In an embodiment, the obtained new time-series data is passed as an input to a Recurrent Neural Network (RNN) to perform a task. The RNN is a unidirectional vanilla RNN, a unidirectional Long-Short Term Memory (LSTM), a unidirectional Gated Recurrent Unit (GRU), a bidirectional vanilla RNN, a bidirectional LSTM and/or a bidirectional GRU. The task is one of a time-series classification task, and a forecasting task.

In an embodiment, the forecasting task includes one or more training samples that are used for training the system 200 to perform the forecasting task. Each training sample of the one or more training samples includes an input window and an output window. In one embodiment, the output window includes one or more target variable that are important for performing the forecasting task. But in few training samples, the target variables are generally found to be missing in the output windows, thereby making it difficult to perform the forecasting task. To overcome this problem, as discussed previously, the system 200 uses a target imputation method (explained with reference to FIGS. 5A to 5C) that helps in training the system 200 to perform the forecasting task even in absence of the target variables in the output window.

Figure 4:
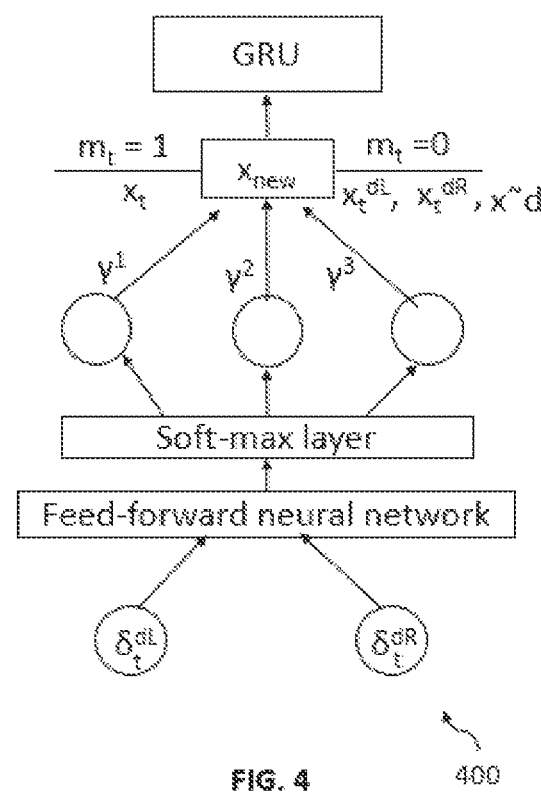
FIG. 4 illustrates a schematic representation of a joint impute and learn technique associated with the missing data prediction system of FIG. 2 for time-series prediction under missing data, in accordance with an embodiment of the present disclosure.

FIG. 4, with reference to FIGS. 1 to 3A-3C, illustrates a schematic representation 400 of a joint impute and learn technique associated with the system 200 of FIG. 2 or the MDPS 106 of FIG. 1 for time-series prediction under missing data, in accordance with an embodiment of the present disclosure.

Figure 5A:
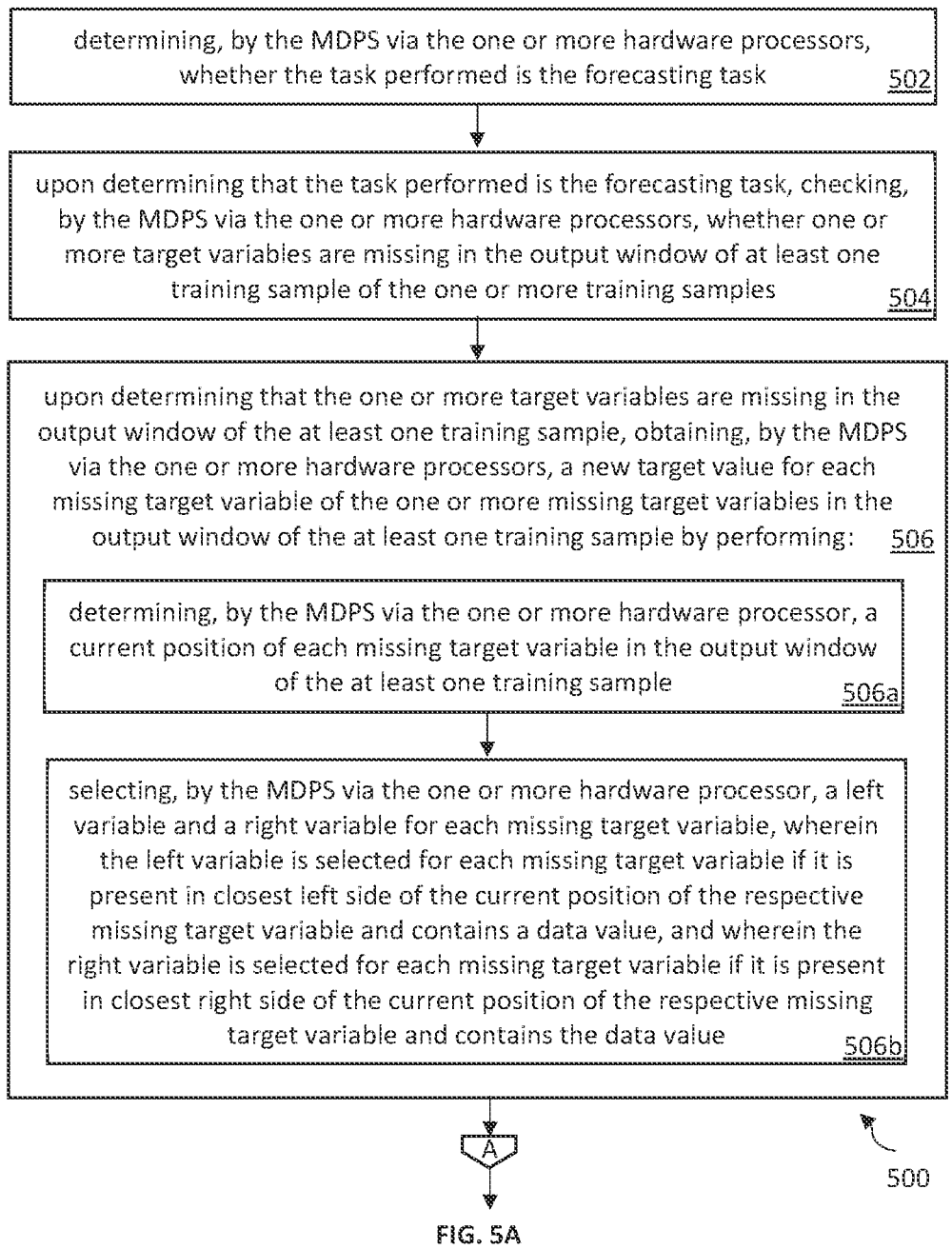
FIGS. 5A, 5B and 5C, collectively, represent an exemplary flow diagram of a target imputation method for performing forecasting task in absence of a target variable in an output window using the MDPS of FIG. 2, in accordance with an embodiment of the present disclosure.
Figure 5B:
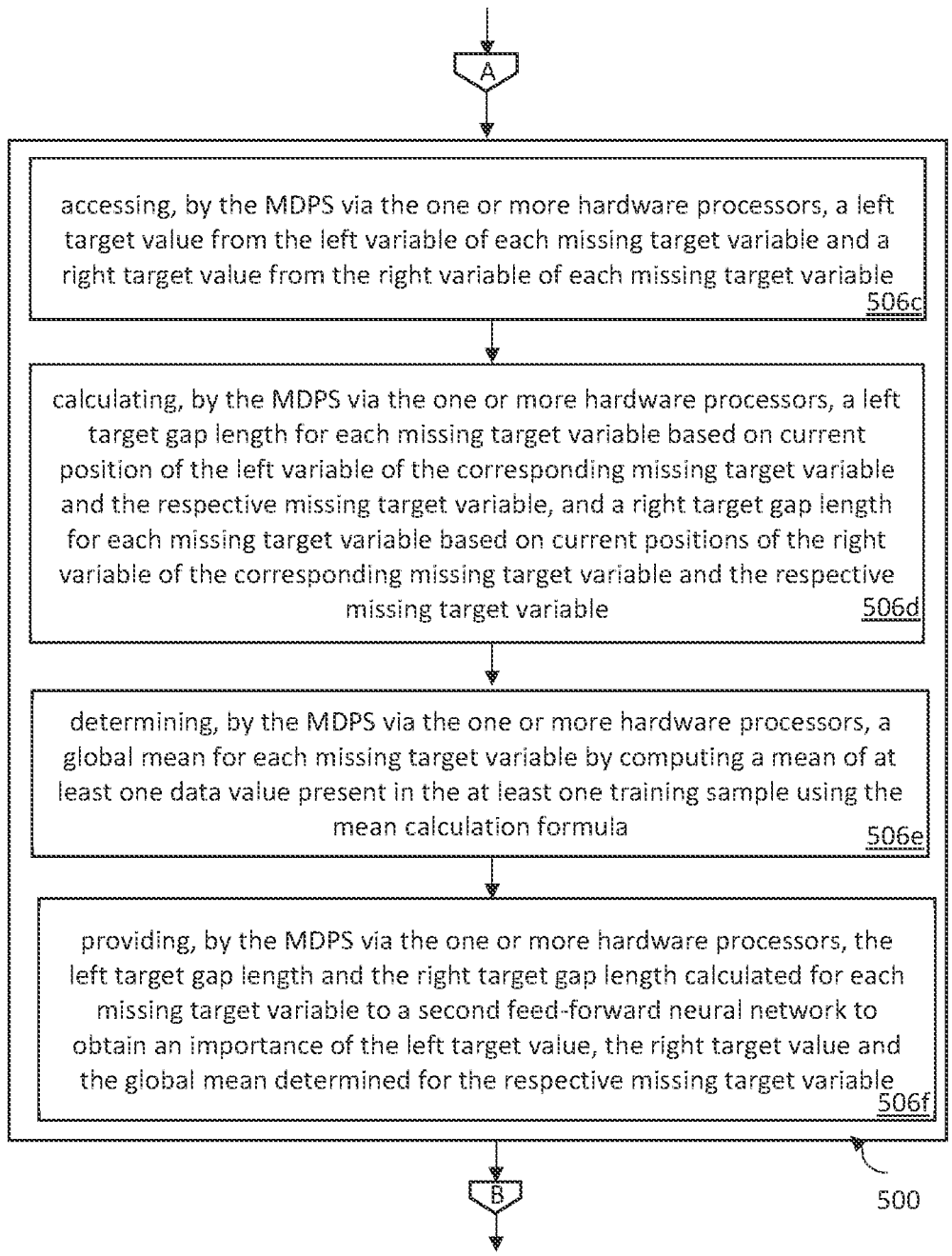
Figure 5C:
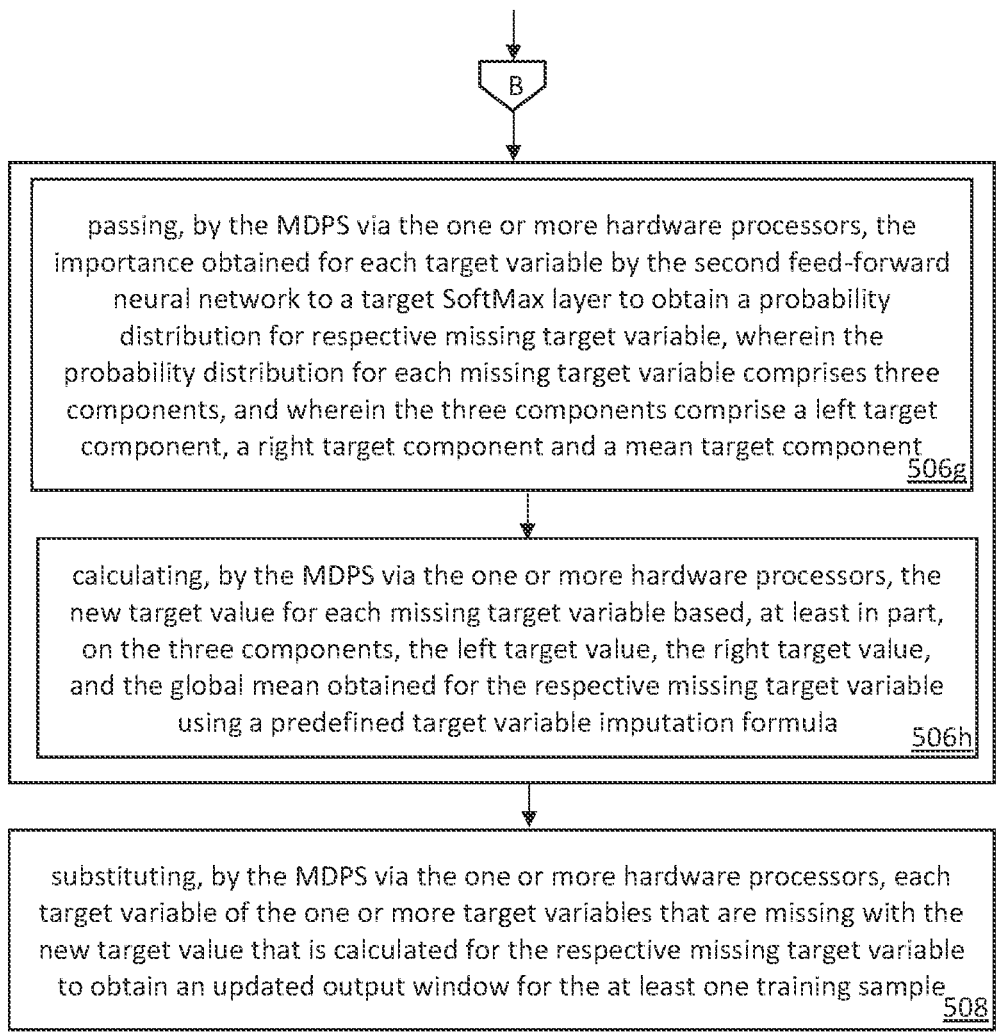

FIGS. 5A, 5B and 5C, with reference to FIGS. 1-4, collectively, represent an exemplary flow diagram of a target imputation method 500 for performing forecasting task in absence of a target variable in an output window using the MDPS 100 of FIG. 1 and system 200 of FIG. 2, in accordance with an embodiment of the present disclosure. In an embodiment, the system 200 comprises one or more data storage devices or the memory 202 operatively coupled to the one or more hardware processors 204 and is configured to store instructions for execution of steps of the method 300 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the target imputation method 500 of the present disclosure will now be explained with reference to the components of the MDPS 100 as depicted in FIG. 1, and the system 200 of FIG. 2.

In an embodiment of the present disclosure, at step 502, the one or more hardware processors 204 of the system 200 determine whether the task performed is the forecasting task.

At step 504 of the present disclosure, the one or more hardware processors 204 of the system 200, upon determining that the task performed is the forecasting task, check whether one or more target variables are missing in the output window of at least one training sample of the one or more training samples. Basically, in case of forecasting, a target variable is a part of an input window in some training samples, while it is a part of an output window in some other training samples. But, in missing scenarios, the target variable can be predominantly missing i.e., the target variables can be missing in one or more output windows associated with the one or more training samples. So, the hardware processors 204, at this step, check whether the target variables are missing in the output window of at least one training sample. In case the target variables are found to be present in the output window of at least one training sample, the hardware processors 204 does not perform the target imputation as there is no need of it. Otherwise, the step 506 is performed.

At step 506 of the present disclosure, the one or more hardware processors 204 of the system 200, upon determining that the one or more target variables are missing in the output window of the at least one training sample, obtain a new target value for each missing target variable of the one or more missing target variables in the output window of the at least one training sample by performing a plurality of steps 506a through 506h for each missing target variable.

At step 506a of the present disclosure, the one or more hardware processors 204 of the system 200 determine a current position of each missing target variable in the output window of the at least one training sample. For example, it is assumed that an input window of a training sample has some input variables, such as $x_1$, $x_2$, $X_3$, $X_t$, and output window include some target variables, such as $X_{t+1}$, $x_{t+2}$, $x_{t+3}$, $x_{t+4}$, $x_{t+5}$ . . . , $x_{t+k}$. The hardware processors 204 previously determined that the target variables $x_{t+3}$, $x_{t+4}$, and $X_{t+5}$ are missing in the output window. Then, at this step, the hardware processors 204 determine that t+4 is the current position of the missing target variable $x_{t+4}$. Similarly, the current position for rest of the missing target variables is determined.

At step 506b of the present disclosure, the one or more hardware processors 204 of the system 200 select a left variable and a right variable for each missing target variable. Once the current position of each missing target variable is determined, the hardware processors 204 select the left variable for each missing target variable if it is present in closest left side of the current position of the respective missing target variable and contains a data value. Similarly, the right variable is selected for each missing target variable if it is present in closest right side of the current position of the respective missing target variable and contains the data value. With reference to previous example, as t+4 is the determined current position of missing target variable $X_{t+4}$, then the left variable that is selected by the hardware processors 204 for $x_{t+4}$ is $x_{t+2}$ and right variable that is selected is $X_{t+6}$.

At step 506c of the present disclosure, the one or more hardware processors 204 of the system 200 access a left target value from the left variable of each missing target variable and a right target value from the right variable of each missing target variable. So, the target variable values of $X_{t+2}$ and $X_{t+6}$ are accessed by the system 200 at this step.

At step 506d of the present disclosure, the one or more hardware processors 204 of the system 200 calculate a left target gap length for each missing target variable based on current position of the left variable of the corresponding missing target variable and the respective missing target variable, and a right target gap length for each missing target variable based on current positions of the right variable of the corresponding missing target variable and the respective missing target variable. So, with reference to previous example, the left target gap length for the $x_{t+4}$ is 4−2=2 and the right target gap length for $X_{t+4}$ is 6−4=2.

At step 506e of the present disclosure, the one or more hardware processors 204 of the system 200 determine a global mean for each missing target variable by computing a mean of at least one data value present in the at least one training sample using the mean calculation formula. In particular, the mean of the target variable values present in the output window containing each missing target variable is computed at this stage using the mean calculation formula that is represented as:

Global mean=(1/Number of data values for target variable present in $row$)*$\Sigma x_i$, where i=1 to number of data values present in row for target variable.

At step 506f of the present disclosure, the one or more hardware processors 204 of the system 200 provide the left target gap length and the right target gap length calculated for each missing target variable to a second feed-forward neural network to obtain an importance of the left target value, the right target value and the global mean determined for the respective missing target variable. The calculated left target gap length i.e., 2 and calculated right target gap length i.e., 2 are passed to the second feed-forward neural network to obtain the importance of the left target value, the right target value and the global mean based on the left target gap length and the right target gap length. In an embodiment, the hardware processors 204 may obtain the importance in form of an output of dimension 3×1.

At step 506g of the present disclosure, the one or more hardware processors 204 of the system 200 pass the importance obtained for each target variable by the second feed-forward neural network to a target SoftMax layer to obtain a probability distribution for respective missing target variable. The probability distribution for each missing target variable includes three components viz a left target component, a right target component and a mean target component.

At step 506h of the present disclosure, the one or more hardware processors 204 of the system 200 calculate the new target value for each missing target variable based, at least in part, on the three components, the left target value, the right target value, and the global mean obtained for the respective missing target variable using a predefined target variable imputation formula defined as:

(Left target component)*(left target value)+(right target component)*(right target value)+(mean target component)*(global mean)

Basically, the new target value for each missing target variable is computed at this step based on the left target component, the right target component, the mean target component, the left target value, the right target value, and the mean value obtained for each missing target variable.

At step 508 of the present disclosure, the one or more hardware processors 204 of the system 200 substitute each target variable of the one or more target variables that are missing with the new target value that is calculated for the respective missing target variable to obtain an updated output window for the at least one training sample. Once the new target value is obtained for each missing target variable, the hardware processors 204 place the new target values in the corresponding output windows and thus obtains updated output windows.

As discussed earlier, currently available RNN based techniques, such as GRU-D only considers a last observed value from left and the immediate value observed from right is totally ignored while performing data imputation, thus causing errors in imputation and learning. In the present application, systems and methods are provided for time-series prediction under missing data using joint impute and learn technique that factors closest left and right observations in addition to mean for deciding the most appropriate input for the missing data, thus reducing errors that occur during imputation and learning stage. The systems and the methods also considers future information that might be important, thereby making it helpful in applications where future predictions need to be done based on past history and where missing data scenarios are very common.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, by a missing data prediction system (MDPS) via one or more hardware processors, time-series data, the time-series data comprising one or more time dependent variables, each time dependent variable of the one or more time dependent variables comprising one or more data values, each data value of the one or more data values comprising one of: a single data value, and a missing entry;
   arranging, by the MDPS via the one or more hardware processors, the one or more data values received with the time-series data in a plurality of cells of a table;
   determining, by the MDPS via the one or more hardware processors, one or more cells in the plurality of cells that have the missing entry;
   for each cell of the one or more cells that has the missing entry, performing:
      determining, by the MDPS via the one or more hardware processor, a current position of each cell in the table;
      selecting, by the MDPS via the one or more hardware processor, a left cell and a right cell for each cell, wherein the left cell is selected for each cell if it is present in closest left side of the current position of each cell and contains the data value, wherein the right cell is selected for each cell if it is present in closest right side of the current position of each cell and contains the data value;
      accessing, by the MDPS via the one or more hardware processors, a left data value from the left cell of each cell and a right data value from the right cell of each cell;
      calculating, by the MDPS via the one or more hardware processors, a left gap length for each cell based on current position of the left cell of each cell and the respective cell, and a right gap length for each cell based on current positions of the right cell of each cell and the respective cell;
      determining, by the MDPS via the one or more hardware processors, a mean value for each cell by computing a mean of at least one data value present in a row comprising the respective cell using a mean calculation formula;
      providing, by the MDPS via the one or more hardware processors, the left gap length and the right gap length calculated for each cell to a first feed-forward neural network to obtain an importance of the left data value, the right data value and the mean value determined for each cell;
      passing, by the MDPS via the one or more hardware processors, the importance obtained for each cell by the first feed-forward neural network to a SoftMax layer to obtain a probability distribution for the respective cell, wherein the probability distribution for each cell comprises three components, and wherein the three components comprise a left component, a right component, and a mean component; and
      calculating, by the MDPS via the one or more hardware processors, a new data value for each cell based, at least in part, on the three components, the left data value, the right data value and the mean value obtained for the respective cell using a predefined formula;
   substituting, by the MDPS via the one or more hardware processors, each cell of the one or more cells that has the missing entry with the new data value calculated for the respective cell to obtain an updated table; and
   creating, by the MDPS via the one or more hardware processors, a new time-series data based on the updated table.

2. The processor implemented method of claim 1, further comprising:
   passing, by the MDPS via the one or more hardware processors, the new time-series data as an input to a Recurrent Neural Network (RNN) to perform a task, the task comprising one of: a time-series classification task, and a forecasting task.

3. The processor implemented method of claim 2, wherein the RNN is:
   a unidirectional vanilla RNN,
   a unidirectional Long-Short Term Memory (LSTM),
   a unidirectional Gated Recurrent Unit (GRU),
   a bidirectional vanilla RNN,
   a bidirectional LSTM, and
   a bidirectional GRU or combinations thereof.

4. The processor implemented method of claim 3, further comprising:
   adding, by the MDPS via the one or more hardware processors, a decayed factor to a hidden state present in the RNN for improving an output of the task.

5. The processor implemented method of claim 2, wherein the forecasting task comprises one or more training samples used for training the MDPS to perform the forecasting task, and wherein each training sample of the one or more training samples includes an input window and an output window.

6. The processor implemented method of claim 5, further comprising:
   determining, by the MDPS via the one or more hardware processors, whether the task performed is the forecasting task;
   upon determining that the task performed is the forecasting task, checking, by the MDPS via the one or more hardware processors, whether one or more target variables are missing in the output window of at least one training sample of the one or more training samples;
   upon determining that the one or more target variables are missing in the output window of the at least one training sample, obtaining, by the MDPS via the one or more hardware processors, a new target value for each missing target variable of the one or more missing target variables in the output window of the at least one training sample by performing:
      determining, by the MDPS via the one or more hardware processor, a current position of each missing target variable in the output window of the at least one training sample;
      selecting, by the MDPS via the one or more hardware processor, a left variable and a right variable for each missing target variable, wherein the left variable is selected for each missing target variable if it is present in closest left side of the current position of the respective missing target variable and contains a data value, and wherein the right variable is selected for each missing target variable if it is present in closest right side of the current position of the respective missing target variable and contains the data value;

accessing, by the MDPS via the one or more hardware processors, a left target value from the left variable of each missing target variable and a right target value from the right variable of each missing target variable;

calculating, by the MDPS via the one or more hardware processors, a left target gap length for each missing target variable based on current position of the left variable of the corresponding missing target variable and the respective missing target variable, and a right target gap length for each missing target variable based on current positions of the right variable of the corresponding missing target variable and the respective missing target variable;

determining, by the MDPS via the one or more hardware processors, a global mean for each missing target variable by computing a mean of at least one data value present in the at least one training sample using the mean calculation formula;

providing, by the MDPS via the one or more hardware processors, the left target gap length and the right target gap length calculated for each missing target variable to a second feed-forward neural network to obtain an importance of the left target value, the right target value and the global mean determined for the respective missing target variable;

passing, by the MDPS via the one or more hardware processors, the importance obtained for each target variable by the second feed-forward neural network to a target SoftMax layer to obtain a probability distribution for respective missing target variable, wherein the probability distribution for each missing target variable comprises three components, and wherein the three components comprise a left target component, a right target component and a mean target component; and calculating, by the MDPS via the one or more hardware processors, the new target value for each missing target variable based, at least in part, on the three components, the left target value, the right target value, and the global mean obtained for the respective missing target variable using a predefined target variable imputation formula; and substituting, by the MDPS via the one or more hardware processors, each target variable of the one or more target variables that are missing with the new target value that is calculated for the respective missing target variable to obtain an updated output window for the at least one training sample.

7. A missing data prediction system (MDPS), comprising:
a memory storing instructions;
one or more communication interfaces; and
one or more hardware processors coupled to the memory via the one or more communication interfaces, wherein the one or more hardware processors are configured by the instructions to:
receive time-series data, the time-series data comprising one or more time dependent variables, each time dependent variable of the one or more time dependent variables comprising one or more data values, each data value of the one or more data values comprising one of: a single data value, and a missing entry;
arrange the one or more data values received with the time-series data in a plurality of cells of a table;

determine one or more cells in the plurality of cells that have the missing entry;

for each cell of the one or more cells that has the missing entry, perform:
determining a current position of each cell in the table;
selecting a left cell and a right cell for each cell, wherein the left cell is selected for each cell if it is present in closest left side of the current position of each cell and contains the data value, wherein the right cell is selected for each cell if it is present in closest right side of the current position of each cell and contains the data value;
accessing a left data value from the left cell of each cell and a right data value from the right cell of each cell;
calculating a left gap length for each cell based on current position of the left cell of each cell and the respective cell, and a right gap length for each cell based on current positions of the right cell of each cell and the respective cell;
determining a mean value for each cell by computing a mean of at least one data value present in a row comprising the respective cell using a mean calculation formula;
providing the left gap length and the right gap length calculated for each cell to a first feed-forward neural network to obtain an importance of the left data value, the right data value and the mean value determined for each cell;
passing the importance obtained for each cell by the first feed-forward neural network to a SoftMax layer to obtain a probability distribution for the respective cell, wherein the probability distribution for each cell comprises three components, wherein the three components comprise a left component, a right component, and a mean component; and
calculating a new data value for each cell based, at least in part, on the three components, the left data value, the right data value, and the mean value obtained for the respective cell using a predefined formula;

substitute each cell of the one or more cells that has the missing entry with the new data value calculated for the respective cell to obtain an updated table; and create a new time-series data based on the updated table.

8. The system of claim 7, wherein the system is further caused to:
pass the new time-series data as an input to a Recurrent Neural Network (RNN) to perform a task, the task comprising one of: a time-series classification task, and a forecasting task.

9. The system of claim 8, wherein the RNN is:
a unidirectional vanilla RNN,
a unidirectional Long-Short Term Memory (LSTM),
a unidirectional Gated Recurrent Unit (GRU),
a bidirectional vanilla RNN,
a bidirectional LSTM, and
a bidirectional GRU or combinations thereof.

10. The system of claim 9, wherein the system is further caused to:
add a decayed factor to a hidden state present in the RNN for improving an output of the task.

11. The system of claim 8, wherein the forecasting task comprises one or more training samples used for training the MDPS to perform the forecasting task, wherein each training sample of the one or more training samples includes an input window and an output window.

12. The system of claim 11, wherein the system is further caused to:

determine whether the task performed is the forecasting task;

upon determining that the task performed is the forecasting task, check whether one or more target variables are missing in the output window of at least one training sample of the one or more training samples;

upon determining that the one or more target variables are missing in the output window of the at least one training sample, obtain a new target value for each missing target variable of the one or more missing target variables in the output window of the at least one training sample by performing:

determining a current position of each missing target variable in the output window of the at least one training sample;

selecting a left variable and a right variable for each missing target variable, wherein the left variable is selected for each missing target variable if it is present in closest left side of the current position of the respective missing target variable and contains a data value, and wherein the right variable is selected for each missing target variable if it is present in closest right side of the current position of the respective missing target variable and contains the data value;

accessing a left target value from the left variable of each missing target variable and a right target value from the right variable of each missing target variable;

calculating a left target gap length for each missing target variable based on current position of the left variable of the corresponding missing target variable and the respective missing target variable, and a right target gap length for each missing target variable based on current positions of the right variable of the corresponding missing target variable and the respective missing target variable;

determining a global mean for each missing target variable by computing a mean of at least one data value present in the at least one training sample using the mean calculation formula;

providing the left target gap length and the right target gap length calculated for each missing target variable to a second feed-forward neural network to obtain an importance of the left target value, the right target value and the global mean determined for the respective missing target variable;

passing the importance obtained for each target variable by the second feed-forward neural network to a target SoftMax layer to obtain a probability distribution for respective missing target variable, wherein the probability distribution for each missing target variable comprises three components, and wherein the three components comprise a left target component, a right target component and a mean target component; and calculating the new target value for each missing target variable based, at least in part, on the three components, the left target value, the right target value, and the global mean obtained for the respective missing target variable using a predefined target variable imputation formula; and substitute each target variable of the one or more target variables that are missing with the new target value that is calculated for the respective missing target variable to obtain an updated output window for the at least one training sample.

13. One or more non-transitory machine-readable information storage mediums comprising one or more instructions which when executed by one or more hardware processors cause:

receiving, by a missing data prediction system (MDPS), time-series data, the time-series data comprising one or more time dependent variables, each time dependent variable of the one or more time dependent variables comprising one or more data values, each data value of the one or more data values comprising one of: a single data value, and a missing entry;

arranging, by the MDPS, the one or more data values received with the time-series data in a plurality of cells of a table;

determining, by the MDPS, one or more cells in the plurality of cells that have the missing entry;

for each cell of the one or more cells that has the missing entry, performing:

determining, by the MDPS, a current position of each cell in the table;

selecting, by the MDPS, a left cell and a right cell for each cell, wherein the left cell is selected for each cell if it is present in closest left side of the current position of each cell and contains the data value, wherein the right cell is selected for each cell if it is present in closest right side of the current position of each cell and contains the data value;

accessing, by the MDPS, a left data value from the left cell of each cell and a right data value from the right cell of each cell;

calculating, by the MDPS, a left gap length for each cell based on current position of the left cell of each cell and the respective cell, and a right gap length for each cell based on current positions of the right cell of each cell and the respective cell;

determining, by the MDPS, a mean value for each cell by computing a mean of at least one data value present in a row comprising the respective cell using a mean calculation formula;

providing, by the MDPS, the left gap length and the right gap length calculated for each cell to a first feed-forward neural network to obtain an importance of the left data value, the right data value and the mean value determined for each cell;

passing, by the MDPS, the importance obtained for each cell by the first feed-forward neural network to a SoftMax layer to obtain a probability distribution for the respective cell, wherein the probability distribution for each cell comprises three components, and wherein the three components comprise a left component, a right component, and a mean component; and calculating, by the MDPS, a new data value for each cell based, at least in part, on the three components, the left data value, the right data value and the mean value obtained for the respective cell using a predefined formula;

substituting, by the MDPS, each cell of the one or more cells that has the missing entry with the new data value calculated for the respective cell to obtain an updated table; and creating, by the MDPS, a new time-series data based on the updated table.

14. The one or more non-transitory machine-readable information storage mediums of claim 13, wherein the one or more instructions which when executed by the one or more hardware processors further cause:

passing, by the MDPS, the new time-series data as an input to a Recurrent Neural Network (RNN) to perform a task, the task comprising one of: a time-series classification task, and a forecasting task.

15. The one or more non-transitory machine-readable information storage mediums of claim 14, wherein the RNN is:
a unidirectional vanilla RNN,
a unidirectional Long-Short Term Memory (LSTM),
a unidirectional Gated Recurrent Unit (GRU),
a bidirectional vanilla RNN,
a bidirectional LSTM, and
a bidirectional GRU or combinations thereof.

16. The one or more non-transitory machine-readable information storage mediums of claim 15, wherein the one or more instructions which when executed by the one or more hardware processors further cause:
adding, by the MDPS, a decayed factor to a hidden state present in the RNN for improving an output of the task.

17. The one or more non-transitory machine-readable information storage mediums of claim 14, wherein the forecasting task comprises one or more training samples used for training the MDPS to perform the forecasting task, and wherein each training sample of the one or more training samples includes an input window and an output window.

18. The one or more non-transitory machine-readable information storage mediums of claim 17, wherein the one or more instructions which when executed by the one or more hardware processors further cause:
determining, by the MDPS, whether the task performed is the forecasting task;
upon determining that the task performed is the forecasting task, checking, by the MDPS, whether one or more target variables are missing in the output window of at least one training sample of the one or more training samples;
upon determining that the one or more target variables are missing in the output window of the at least one training sample, obtaining, by the MDPS, a new target value for each missing target variable of the one or more missing target variables in the output window of the at least one training sample by performing:
determining, by the MDPS, a current position of each missing target variable in the output window of the at least one training sample;
selecting, by the MDPS via the one or more hardware processor, a left variable and a right variable for each missing target variable, wherein the left variable is selected for each missing target variable if it is present in closest left side of the current position of the respective missing target variable and contains a data value, and wherein the right variable is selected for each missing target variable if it is present in closest right side of the current position of the respective missing target variable and contains the data value;
accessing, by the MDPS, a left target value from the left variable of each missing target variable and a right target value from the right variable of each missing target variable;
calculating, by the MDPS, a left target gap length for each missing target variable based on current position of the left variable of the corresponding missing target variable and the respective missing target variable, and a right target gap length for each missing target variable based on current positions of the right variable of the corresponding missing target variable and the respective missing target variable;
determining, by the MDPS, a global mean for each missing target variable by computing a mean of at least one data value present in the at least one training sample using the mean calculation formula;
providing, by the MDPS, the left target gap length and the right target gap length calculated for each missing target variable to a second feed-forward neural network to obtain an importance of the left target value, the right target value and the global mean determined for the respective missing target variable;
passing, by the MDPS, the importance obtained for each target variable by the second feed-forward neural network to a target SoftMax layer to obtain a probability distribution for respective missing target variable, wherein the probability distribution for each missing target variable comprises three components, and wherein the three components comprise a left target component, a right target component and a mean target component; and
calculating, by the MDPS, the new target value for each missing target variable based, at least in part, on the three components, the left target value, the right target value, and the global mean obtained for the respective missing target variable using a predefined target variable imputation formula; and
substituting, by the MDPS, each target variable of the one or more target variables that are missing with the new target value that is calculated for the respective missing target variable to obtain an updated output window for the at least one training sample.

* * * * *